United States Patent
Mustafa et al.

(10) Patent No.: US 11,708,850 B2
(45) Date of Patent: Jul. 25, 2023

(54) SELF-TIGHTENING FASTENING APPARATUS FOR VIBRATING WORK-PARTS

(71) Applicants: Muhannad Mustafa, Milpitas, CA (US); Nusrat Jahan Chhanda, Milpitas, CA (US)

(72) Inventors: Muhannad Mustafa, Milpitas, CA (US); Nusrat Jahan Chhanda, Milpitas, CA (US)

(*) Notice: Subject to any disclaimer, the term of this patent is extended or adjusted under 35 U.S.C. 154(b) by 297 days.

(21) Appl. No.: 17/217,802

(22) Filed: Mar. 30, 2021

(65) Prior Publication Data
US 2022/0136556 A1 May 5, 2022

Related U.S. Application Data

(60) Provisional application No. 63/110,247, filed on Nov. 5, 2020.

(51) Int. Cl.
 *F16B 35/04* (2006.01)
 *F16B 39/284* (2006.01)

(52) U.S. Cl.
 CPC .......... *F16B 39/284* (2013.01); *F16B 35/044* (2013.01)

(58) Field of Classification Search
 CPC ........ F16B 39/16; F16B 39/12; F16B 35/044; F16B 39/026; F16B 39/284
 USPC ................................ 411/412, 231, 243, 244
 See application file for complete search history.

(56) References Cited

U.S. PATENT DOCUMENTS

| | | | |
|---|---|---|---|
| 138,268 A * | 4/1873 | Miller | |
| 501,345 A * | 7/1893 | Holmes | |
| 853,150 A * | 5/1907 | Bartz | A61B 17/863 411/413 |
| 857,526 A * | 6/1907 | Knopf | F16B 25/0015 411/412 |
| 916,421 A * | 3/1909 | Crittenden | B23K 20/1255 228/2.1 |
| 1,093,050 A * | 4/1914 | Heckel | F16B 31/02 411/933 |
| 1,465,015 A * | 8/1923 | Lerch | F16B 39/24 411/932 |
| 2,313,763 A * | 3/1943 | Olsen | E01B 11/38 411/223 |
| 2,391,232 A * | 12/1945 | Farrell | F16B 39/16 411/932 |
| 6,125,526 A * | 10/2000 | Wierzchon | F16B 5/0275 411/335 |
| 6,227,430 B1 * | 5/2001 | Rosen | B23K 20/1255 228/2.1 |

(Continued)

*Primary Examiner* — Gary W Estremsky

(57) ABSTRACT

A self-tightening fastening apparatus for vibrating work-parts includes a male fastener, a main female fastener, a locking female fastener, an anti-rotation female fastener, and a first compression body. The main female fastener is threadedly engaged around a first threaded-shaft section of the male fastener, wherein a head of the male fastener and the main female fastener compress the vibrating work-parts together. The locking female fastener is threadedly engaged around a second threaded-shaft section of the male fastener. The first compression body is compressed in between the main female fastener and the locking female fastener. The anti-rotation female fastener is threadedly engaged around a third threaded-shaft section of the male fastener.

7 Claims, 8 Drawing Sheets

(56) References Cited

U.S. PATENT DOCUMENTS

| | | | |
|---|---|---|---|
| 8,303,634 B2* | 11/2012 | Martin | A61B 17/863 411/413 |
| 2009/0162165 A1* | 6/2009 | Chen | F16B 25/0015 411/412 |

* cited by examiner

US 11,708,850 B2

SELF-TIGHTENING FASTENING APPARATUS FOR VIBRATING WORK-PARTS

The current application claims a priority to the U.S. Provisional Patent application Ser. No. 63/110,247 filed on Nov. 5, 2020.

FIELD OF THE INVENTION

The present invention relates generally to a threaded fastener. More specifically, the present invention is a self-tightening fastening apparatus that is utilized between vibrating work-parts to operates under high vibration without losing torque overtime.

BACKGROUND OF THE INVENTION

A fastener is a common mechanical part used in various machines and engineering applications. The most common type of fastener that is utilized to mount two work-parts together is a nut and bolt fastener. More specifically, the bolt fastener is often used to make a bolted joint as the nut fastener applies an axial clamping force thus attaching two work-parts together. However, when it comes to vibrating work-parts, the standard fasteners do not provide a secured connection. More specifically, the standard fasteners are not resistant to vibration and loss torque overtime thus compromising the corresponding connection. Even though there have been several attempts to improve the standard fasteners into vibration resist fasteners by utilizing a locking nut and an anti-rotating feature, the existing fasteners do not fully resist vibrations without losing torque.

It is therefore an objective of the present invention to provide a self-tightening fastening apparatus for vibrating work-parts to overcome one or more of the above-mentioned problems and/or limitations. More specifically, the present invention utilizes multi-diameter shaft sections within a male fastener and a plurality of corresponding female fasteners for each shaft section, along with at least one compression body, so that the vibrating work-parts can be mounted with losing torque overtime. The multi-diameter shaft sections are configured with a combination of a right-handed thread and a left-handed thread to cancel out any clockwise or counterclockwise rotation of the male fastener with the engagement of the female fasteners.

DETAIL DESCRIPTIONS OF THE INVENTION

All illustrations of the drawings are for the purpose of describing selected versions of the present invention and are not intended to limit the scope of the present invention.

Figure 1:
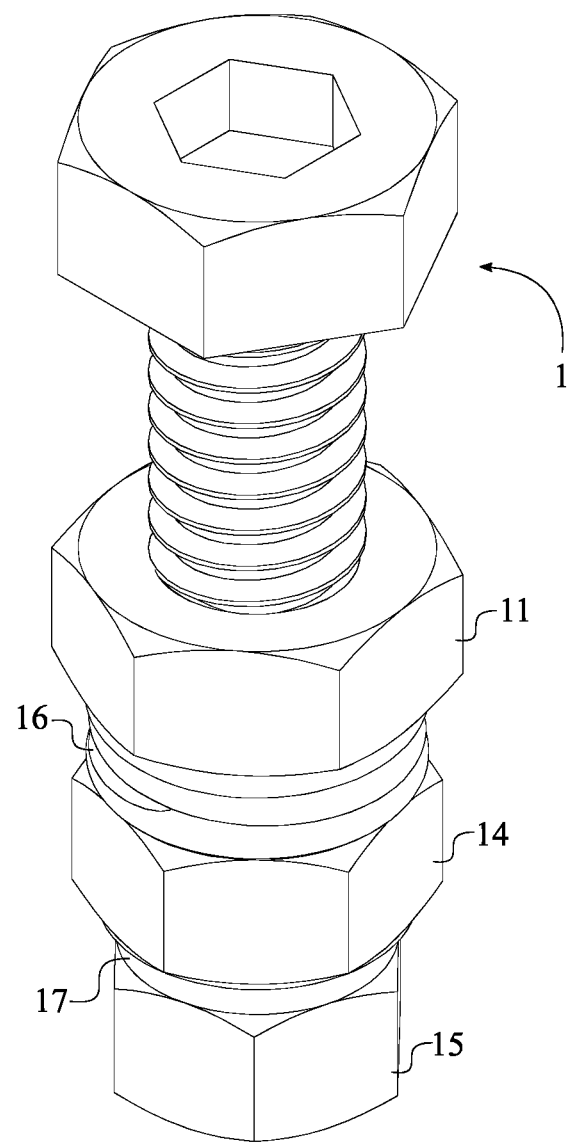
FIG. 1 is a perspective view of the present invention.
Figure 2:
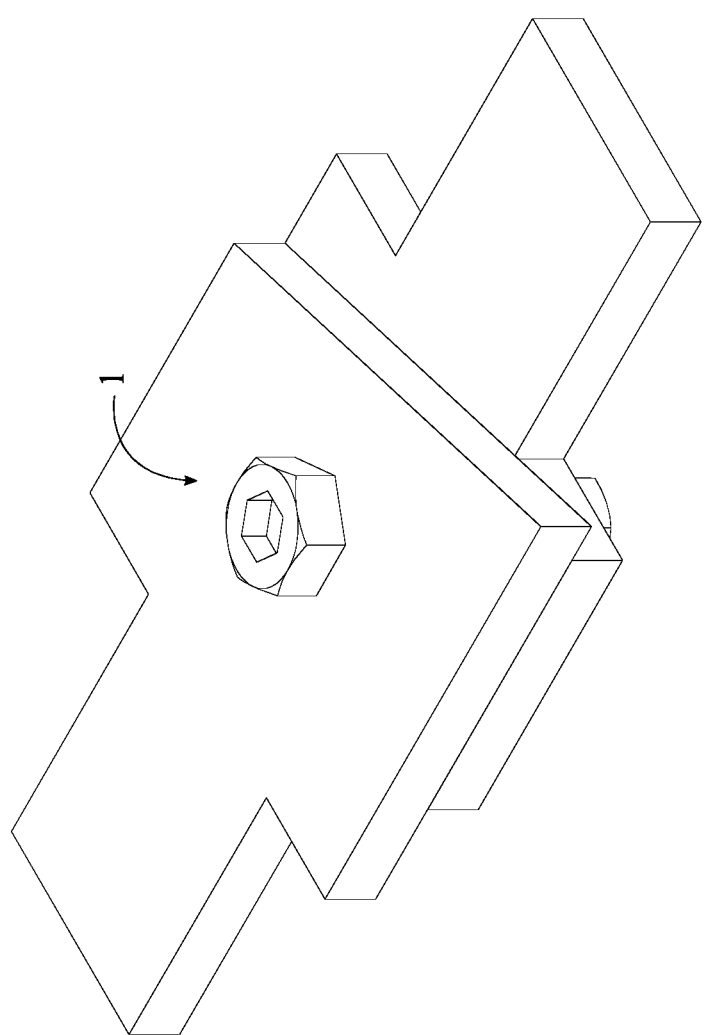
FIG. 2 is a top perspective view of the present invention being engaged with the two vibrating work-parts.
Figure 3:
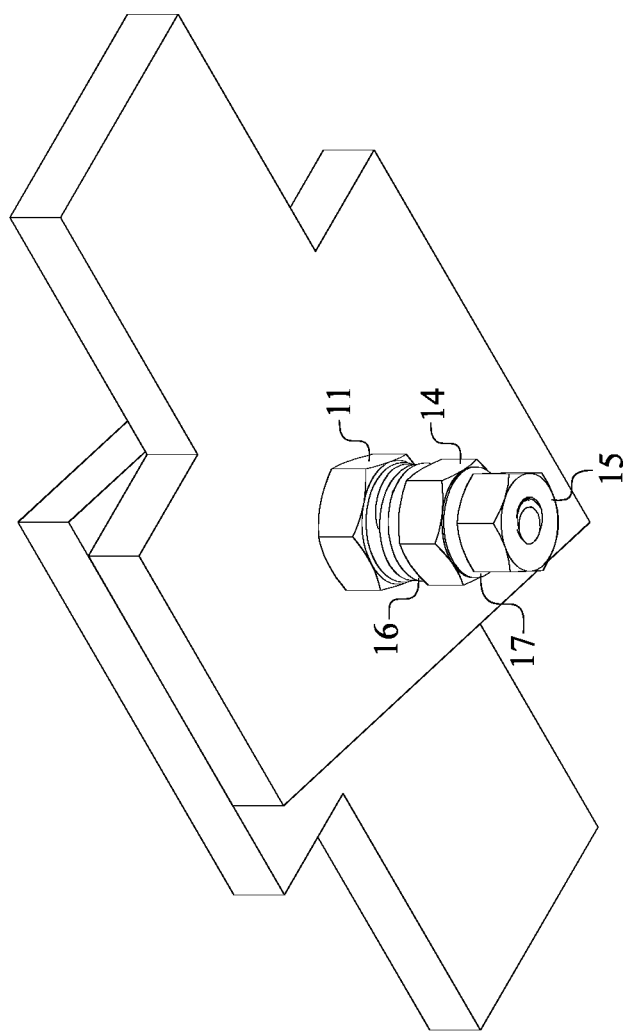
FIG. 3 is a bottom perspective view of the present invention being engaged with the two vibrating work-parts.

The present invention is a self-tightening fastening apparatus for vibrating work-parts that can be utilized under any vibration force without losing torque. The present invention can be easily installed/uninstalled and can be used in aerospace, automotive, energy industries, etc. Due to the self-tightening capability of the present invention, overall failure does not depend on tightening preload of the present invention. The present invention comprises a male fastener 1, a main female fastener 11, a locking female fastener 14, an anti-rotation female fastener 15, and a first compression body 16 as shown in FIG. 1. The male fastener 1 is designed to insert through at least two vibrating work-parts and comprises a head 2, a first threaded-shaft section 5, a second threaded-shaft section 7, and a third threaded-shaft section 9 as shown in FIG. 2-4.

In reference to the general configuration of the present invention, the main female fastener 11 is threadedly engaged around the first threaded-shaft section 5 so that the head 2 and the main female fastener 11 are able to compress the vibrating work-parts together. The locking female fastener 14 is threadedly engaged around the second threaded-shaft section 7 to restrict the axial movement of the main female fastener 11. The first compression body 16 is compressed in between the main female fastener 11 and the locking female fastener 14 to compensate for slight axial movement of the main female fastener 11. The anti-rotation female fastener 15 is threadedly engaged around the third threaded-shaft section 9 and compressed on the second female fastener 1.

Figure 4:
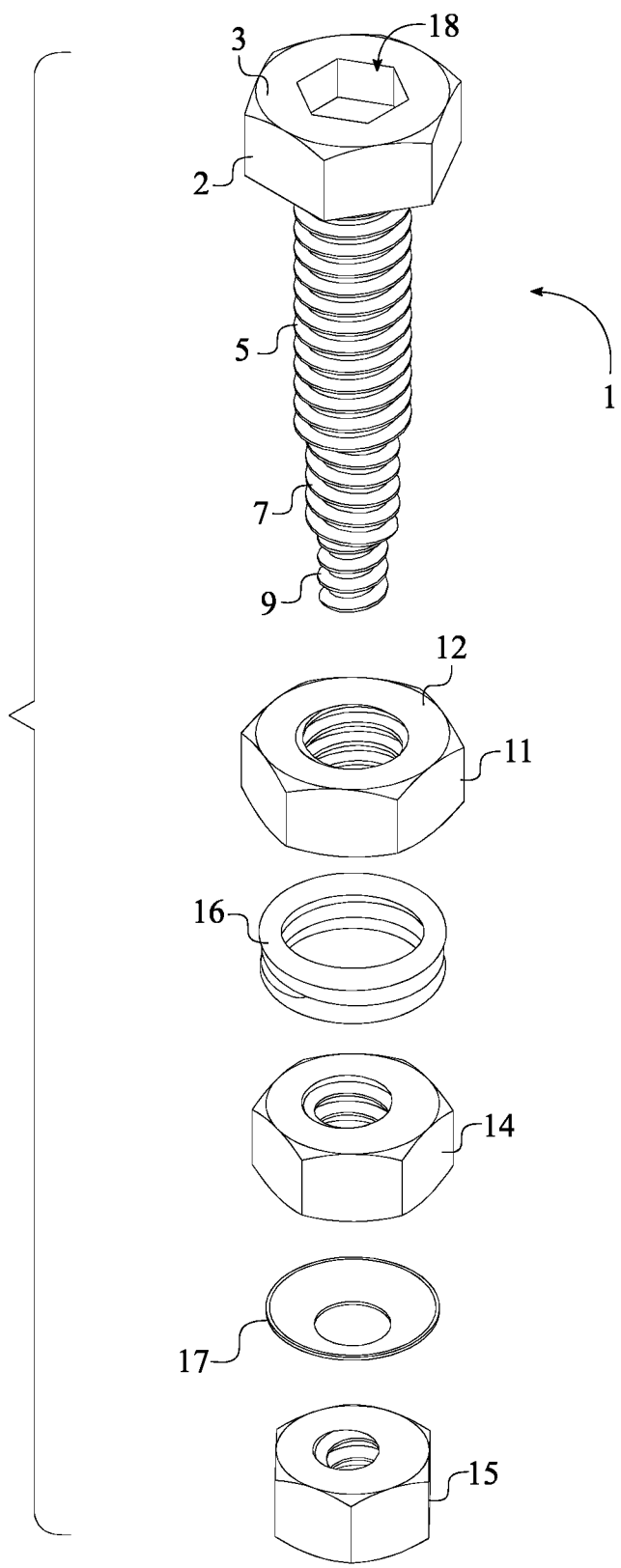
FIG. 4 is a perspective exploded view of the present invention.
Figure 5:
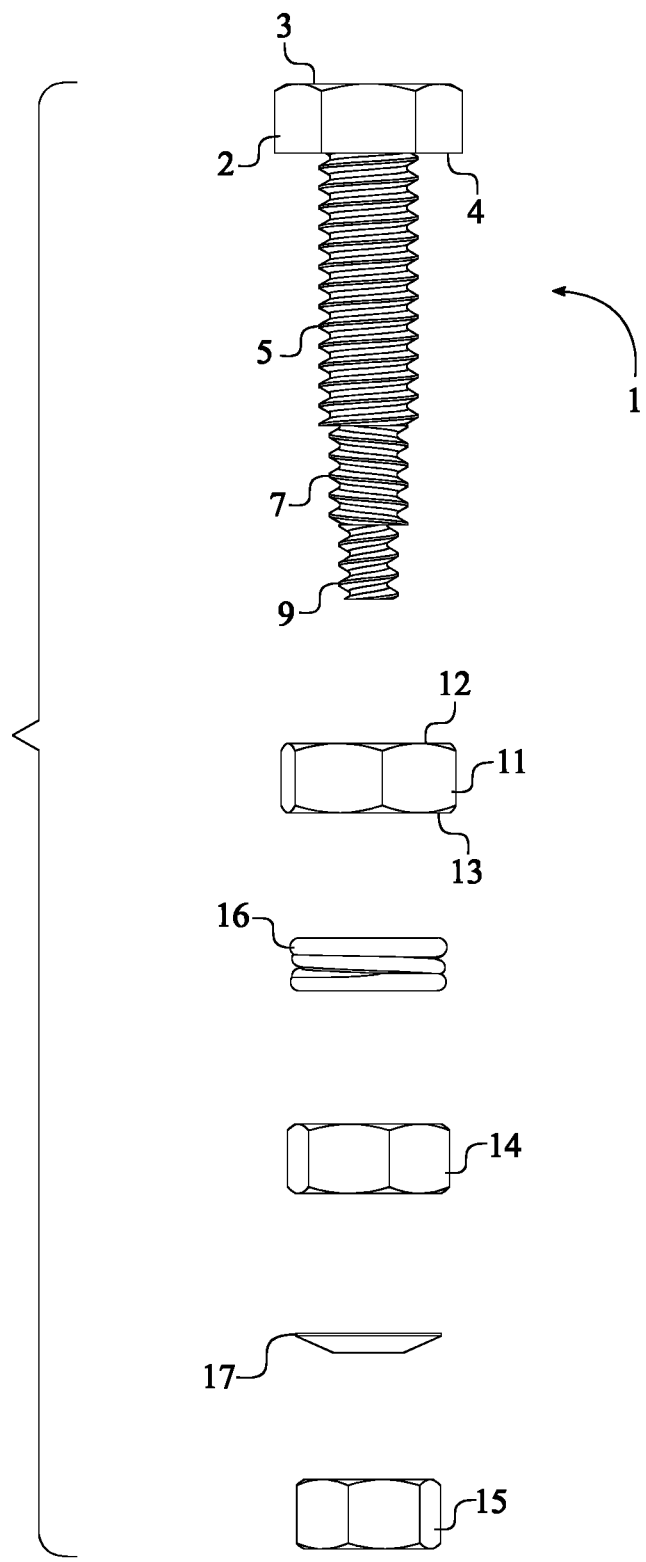
FIG. 5 is a side exploded view of the present invention.

In reference to FIG. 4-5, the male fastener 1 is generally similar to the standard bot fastener. However, the first threaded-shaft section 5, the second threaded-shaft section 7, and the third threaded-shaft section 9 are structurally different from each other for the functionality of the present invention. The head 2 function as the engagement body between the male fastener 1 and a torque applying tool so that the male fastener 1 can be tighten within the present invention. The head 2 comprises an outer surface 3 and a first work-part bracing surface 4, wherein the outer surface 3 and the first work-part bracing surface 4 oppositely positioned of each other about the head 2. In other words, the outer surface 3 is generally oriented towards the torque applying tool and the first work-part bracing surface 4 is oriented towards a first part of the at least two vibrating work-parts. The first threaded-shaft section 5 is concentrically connected to the head 2. More specifically, the first threaded-shaft section 5 is concentrically connected to the first work-part bracing surface 4 of the head 2. As a result, when the male fastener 1 is inserted into the at least two vibrating work-parts, only the first threaded-shaft section 5 traverses through the at least two vibrating work-parts. The second threaded-shaft section 7 is concentrically connected to the first threaded-shaft section 5 as the first threaded-shaft section 5 is positioned in between the head 2 and the second threaded-shaft section 7. The third threaded-shaft section 9 is concentrically connected to the second threaded-shaft section 7 as the second threaded-shaft section 7 is positioned in between the first threaded-shaft section 5 and the third threaded-shaft section 9.

The main female fastener 11, preferably a nut fastener, is threadedly engaged around the first threaded-shaft section 5 so that the at least two vibrating work-parts can be tightened, opposite of the head 2. In reference to FIG. 5-7, the main female fastener 11 comprises a second work-part bracing surface 12 and an outer bracing surface 13. The second work-part bracing surface 12 and the outer bracing surface 13 are oppositely positioned of each other about the main female fastener 11. When the main female fastener 11 is threadedly engaged with the first threaded-shaft section 5, the first work-part bracing surface 4 and the second work-part bracing surface 12 are oriented towards each other as the second work-part bracing surface 12 is oriented towards a second part of the at least two vibrating work-parts. In reference to FIG. 8, a first diameter 19 of the first threaded-shaft section 5 is larger than a second diameter 20 of the second threaded-shaft section 7. The second diameter 20 of the second threaded-shaft section 7 is larger than a third diameter 21 of the third threaded-shaft section 9. As a result, the main female fastener 11 can be easily inserted around the third threaded-shaft section 9 and the second threaded-shaft section 7 without any obstruction. Then, the main female fastener 11 can be threadedly engaged around the first threaded-shaft section 5.

Figure 6:
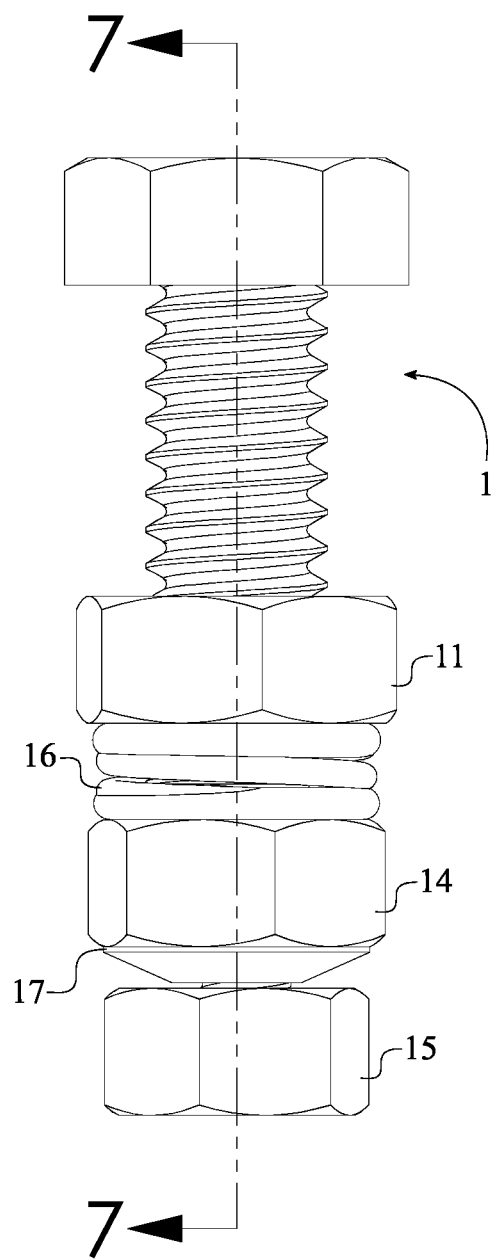
FIG. 6 is a side view of the present invention, showing the plane upon which a cross sectional view is taken shown in FIG. 7.
Figure 7:
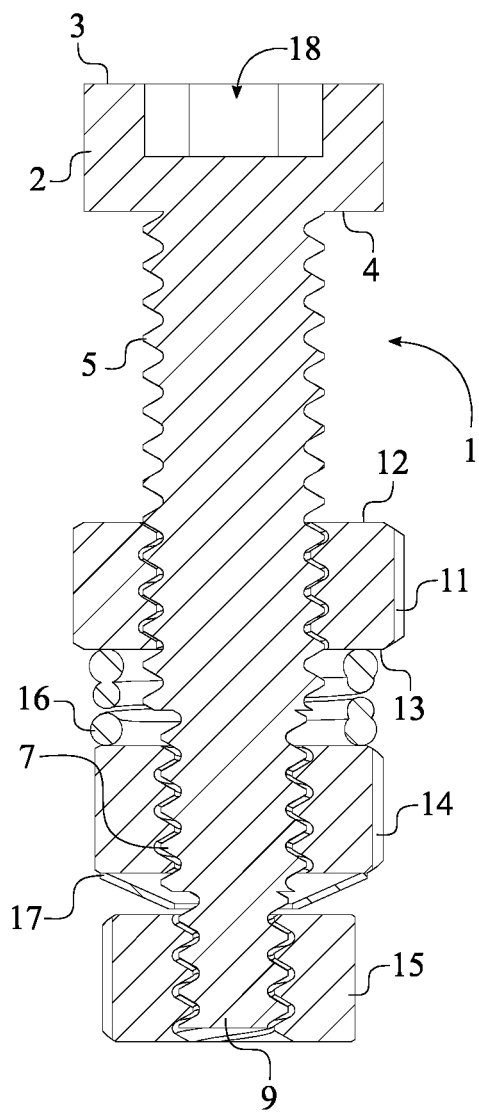
FIG. 7 is a cross sectional view of the present invention taken along line 7-7 of FIG. 6.
Figure 8:
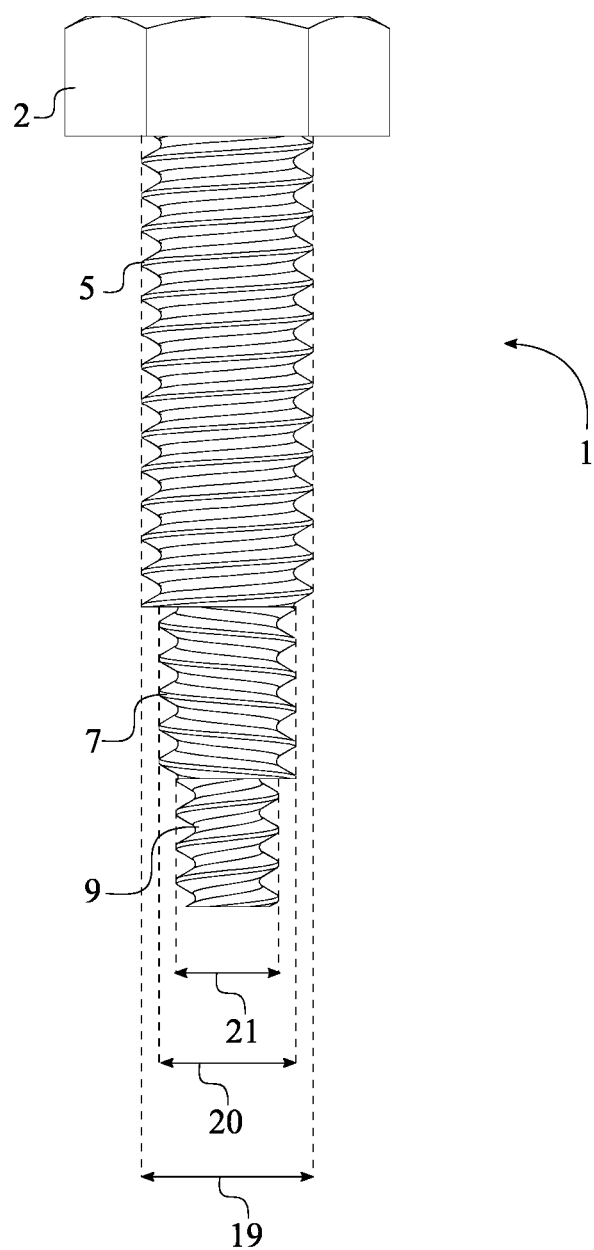
FIG. 8 is a side view of the male fastener of the present invention, showing the first diameter, the second diameter, and the third diameter.

In reference to FIG. 5-7, the locking female fastener 14 is threadedly engaged around the second threaded-shaft section 7 as the first compression body 16 is concentrically positioned around the first threaded-shaft section 5 and the second threaded-shaft section 7 and compressed in between the main female fastener 11 and the locking female fastener 14. More specifically, the locking female fastener 14 restricts any possible axial movement of the main female fastener 11 overtime as the first compression body 16 is able to absorb slight movements of the main female fastener 11. In other words, the first compression body 16 is compressed in between the outer bracing surface 13 and the locking female fastener 14 thus resulting the first compression body 16 to expand and compress with respect to any possible axial movement of the main female fastener 11 while the locking female fastener 14 maintained a fixed position along the second threaded-shaft section 7. Due to the fact that the second diameter 20 is larger than the third diameter 21, the locking female fastener 14 can be easily inserted around the third threaded-shaft section 9 and threadedly engaged around the second threaded-shaft section 7 without any obstruction. Additionally, the locking female fastener 14 does not threadedly engaged with the first threaded-shaft section 5 since the first diameter 19 is larger than the second diameter 20 as shown in FIG. 8.

In reference to FIG. 5-8, the anti-rotation female fastener 15 is threadedly engaged around the third threaded-shaft section 9. More specifically, the anti-rotation female fastener 15 restricts any possible axial movement of the locking female fastener 14 overtime. Due to the fact that the second diameter 20 is larger than the third diameter 21, the anti-rotation female fastener 15 does not threadedly engage with the second threaded-shaft section 7 and only threadedly engages around the third threaded-shaft section 9.

In reference to FIG. 5-7, the present invention can further comprise a second compression body 17. More specifically, the second compression body 17 is concentrically positioned around the second threaded-shaft section 7 and the third threaded-shaft section 9. The second compression body 17 is compressed in between the locking female fastener 14 and the anti-rotation female fastener 15 thus resulting the second compression body 17 to expand and compress with respect to any possible axial movement of the locking female fastener 14 while the anti-rotation female fastener 15 maintained a fixed position along the third threaded-shaft section 9.

The first compression body 16 is preferably a spring body, and the second compression body 17 is preferably a Belleville spring washer as shown in FIG. 5. However, the first compression body 16 and the second compression body 17 are not limited to the preferred embodiments can be any other types of compression bodies such as split washer, any types of spring washers, elastic bodies, etc.

The head 2 is preferably formed into a hexagonal shape to receive a traditional socket and ratchet torque applying tool. The present invention can further comprise a drive feature 18 in order to engage with other torque applying tool other than the traditional socket and ratchet. In reference to FIG. 4 and FIG. 7, the drive feature 18 traverses into the head 2 from the outer surface 3 so that the other toque applying tools such as phillips head 2 screw drivers, flat head 2 screw drivers, torx head 2 screw drivers, hex head 2 screw drivers, and any other types of torque applying tools can engage with the head 2.

In some embodiment of the present invention, the first threaded-shaft section 5 is a right-handed thread section as the main female fastener 11 threadedly is engaged with the right-handed thread section. The second threaded-shaft section 7 is a left-handed thread section as the locking female fastener 14 threadedly is engaged with the left-handed thread section. The third threaded-shaft section 9 is a right-handed thread section as the anti-rotation female fastener 15 threadedly is engaged with the left-handed thread section.

In some embodiment of the present invention, the first threaded-shaft section 5 is a left-handed thread section as the main female fastener 11 threadedly is engaged with the right-handed thread section. The second threaded-shaft section 7 is a right-handed thread section as the locking female fastener 14 threadedly is engaged with the left-handed thread section. The third threaded-shaft section 9 is a left-handed thread section as the anti-rotation female fastener 15 threadedly is engaged with the left-handed thread section.

The same concept of the present invention can be applied to a self-tightening screw fastener that comprises a main fastener, a locking fastener, a compression body, and an anti-rotation cap. The main fastener comprises a top threaded portion, a radial platform, and a bottom threaded portion, wherein the top threaded portion and the bottom threaded portion are concentrically connected to the radial platform and oppositely positioned of each other about the radial platform. The bottom threaded portion is threadedly engaged into the first part of the at least two vibrating work-parts thus allowing the compression body to be concentrically positioned atop the radial platform thus encircling the top threaded portion. The bottom threaded portion is preferably formed into a right-handed thread structure. The locking fastener is an externally threaded tubular body so that the locking fastener can threadedly engage with the second part of the at least two vibrating work-parts and applies pressure to a free end of the compression body. The locking fastener is preferably formed into a left-handed thread structure. The anti-rotation cap comprises an internally threaded tubular body and a cap, wherein the cap is terminally connected to the internally threaded tubular body. More specifically, the internally threaded body is threadedly engaged with the top threaded portion until the cap is positioned against a free end of the top threaded portion. The anti-rotation cap is preferably formed into a right-handed threaded structure. In an alternative embodiment of the self-tightening screw fastener, the bottom threaded portion can be formed into a left-handed thread structure, the locking fastener can be formed into a right-handed thread structure, and the anti-rotation cap can be formed a left-handed threaded structure.

Although the invention has been explained in relation to its preferred embodiment, it is to be understood that many other possible modifications and variations can be made without departing from the spirit and scope of the invention as hereinafter claimed.

What is claimed is:

1. A self-tightening fastening apparatus for vibrating work-parts comprising:
   a male fastener;
   a main female fastener;
   a locking female fastener;
   an anti-rotation female fastener;
   a first compression body;
   the male fastener comprising a head, a first threaded-shaft section, a second threaded-shaft section, and a third threaded-shaft section;
   the first threaded-shaft section being concentrically connected to the head;
   the second threaded-shaft section being concentrically connected to the first threaded-shaft section;
   the first threaded-shaft section being positioned in between the head and the second threaded-shaft section;
   the third threaded-shaft section being concentrically connected to the second threaded-shaft section;
   the second threaded-shaft section being positioned in between the first threaded-shaft section and the third threaded-shaft section;
   the main female fastener being threadedly engaged around the first threaded-shaft section;
   the locking female fastener being threadedly engaged around the second threaded-shaft section;
   the first compression body being concentrically positioned around the first threaded-shaft section and the second threaded-shaft section;
   the first compression body being compressed in between the main female fastener and the locking female fastener; and
   the anti-rotation female fastener being threadedly engaged around the third threaded-shaft section.

2. The self-tightening fastening apparatus for vibrating work-parts as claimed in claim 1 comprising:
   the main female fastener comprising a second work-part bracing surface and an outer bracing surface;
   the second work-part bracing surface and the outer bracing surface being oppositely positioned of each other about the main female fastener;
   the first threaded-shaft section being concentrically connected to a first work-part bracing surface of the head;
   the first compression body being compressed in between the outer bracing surface and the locking female fastener; and
   the first work-part bracing surface and the second work-part bracing surface being oriented towards each other.

3. The self-tightening fastening apparatus for vibrating work-parts as claimed in claim 2 comprising:
   a drive feature;
   the head further comprising an outer surface;
   the outer surface and the first work-part bracing surface being oppositely positioned of each other about the head; and
   the drive feature traversing into the head from the outer surface.

4. The self-tightening fastening apparatus for vibrating work-parts as claimed in claim 1 comprising:
   a second compression body;
   the second compression body being concentrically positioned around the second threaded-shaft section and the third threaded-shaft section; and
   the second compression body being compressed in between the locking female fastener and the anti-rotation female fastener.

5. The self-tightening fastening apparatus for vibrating work-parts as claimed in claim 1 comprising:
   a first diameter of the first threaded-shaft section being larger than a second diameter of the second threaded-shaft section; and
   the second diameter of the second threaded-shaft section being larger than a third diameter of the third threaded-shaft section.

6. The self-tightening fastening apparatus for vibrating work-parts as claimed in claim 1 comprising:
   the first threaded-shaft section being a right-handed thread section;
   the second threaded-shaft section being a left-handed thread section; and
   the third threaded-shaft section being a right-handed thread section.

7. The self-tightening fastening apparatus for vibrating work-parts as claimed in claim 1 comprising:
   the first threaded-shaft section being a left-handed thread section;
   the second threaded-shaft section being a right-handed thread section; and
   the third threaded-shaft section being a left-handed thread section.

* * * * *